May 5, 1964   J. R. JENSEN ETAL   3,131,888
AMPHIBIOUS HELICOPTER WITH DETACHABLE HULL
Filed July 11, 1962   4 Sheets-Sheet 1

INVENTORS
James R. Jensen
Donald R. Jacoby
BY
Bialos & Schlemmer
Attorneys

May 5, 1964 J. R. JENSEN ETAL 3,131,888
AMPHIBIOUS HELICOPTER WITH DETACHABLE HULL
Filed July 11, 1962 4 Sheets-Sheet 2

INVENTORS
James R. Jensen
Donald R. Jacoby
BY
Bialos & Schlemmer
Attorneys

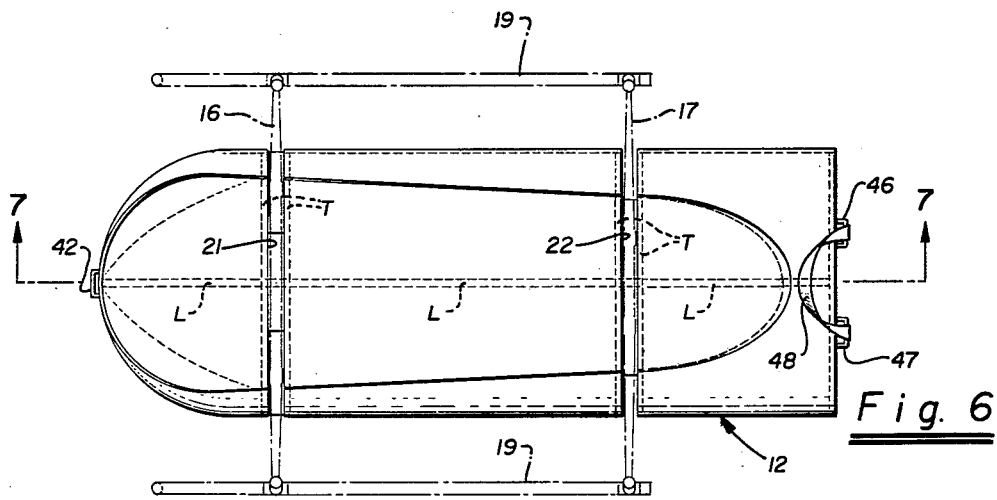
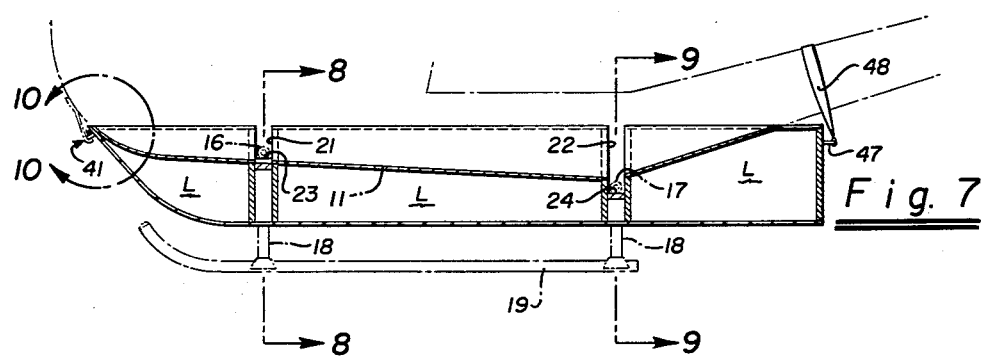
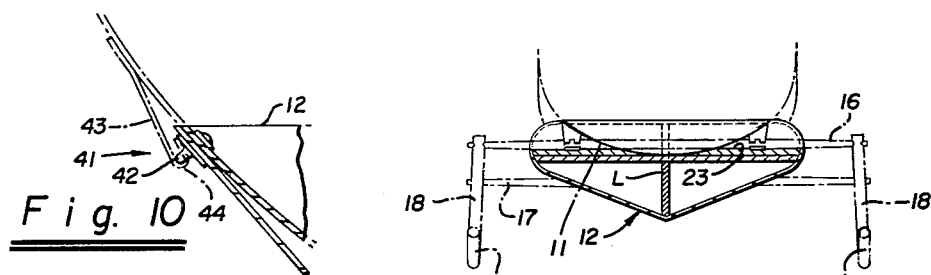
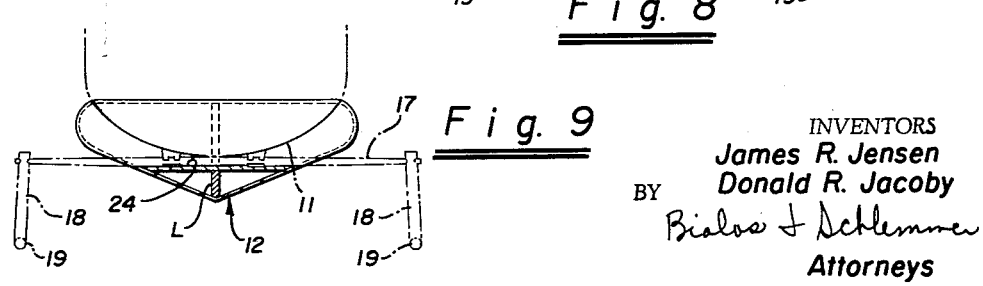

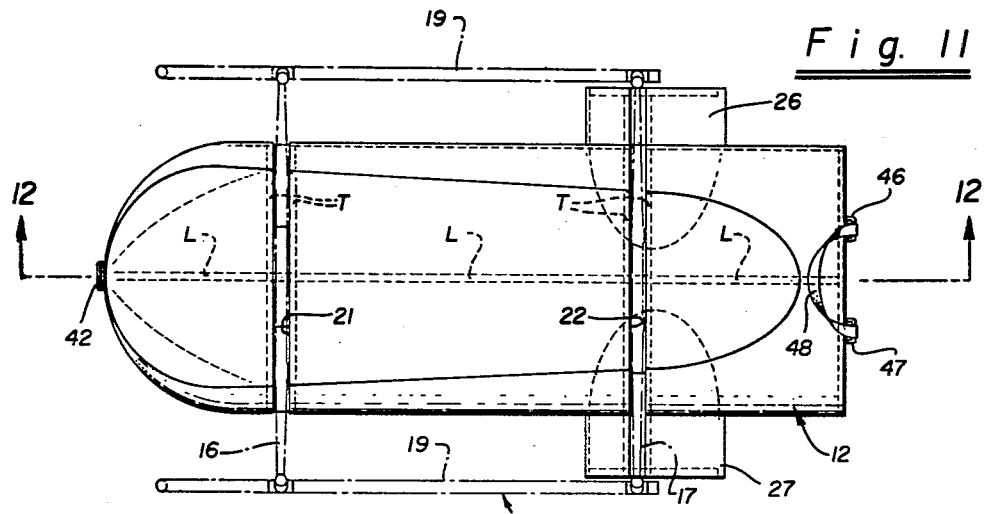
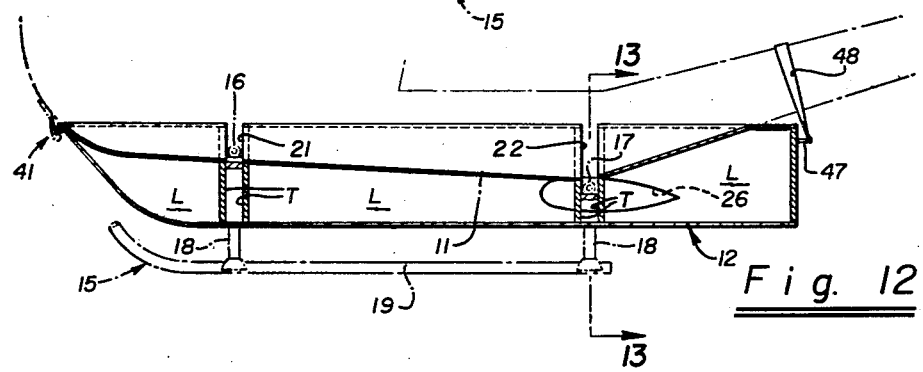
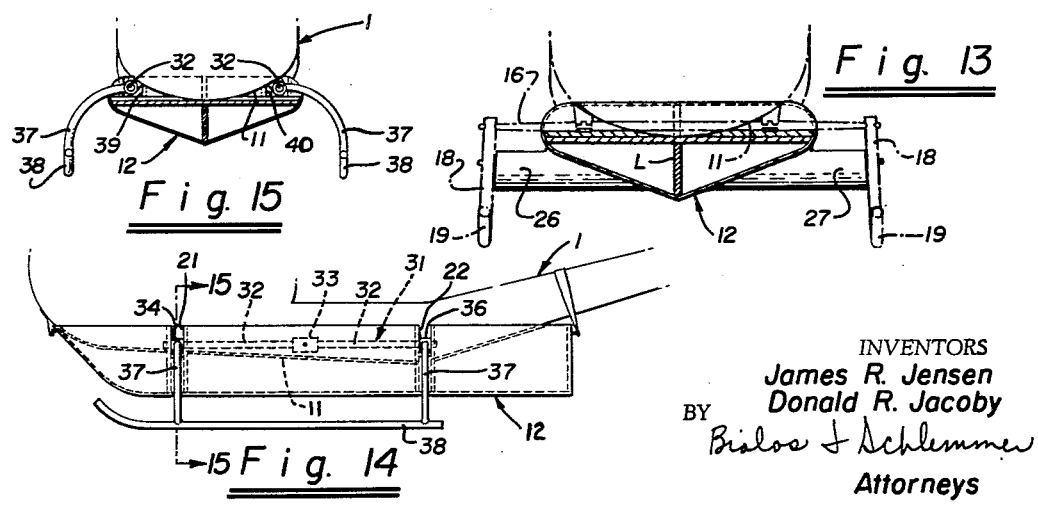

3,131,888
AMPHIBIOUS HELICOPTER WITH DETACH-
ABLE HULL
James R. Jensen and Donald R. Jacoby, Los Altos, Calif.,
assignors, by mesne assignments, to Eltra Corporation,
Brooklyn, N.Y., a corporation of New York
Filed July 11, 1962, Ser. No. 209,194
11 Claims. (Cl. 244—17.17)

This invention relates generally to an aircraft capable of landing upon and taking off from a body of water. More particularly, this invention relates to a helicopter type aircraft which is amphibious so that the same may be landed with equal facility on land or water.

Still more particularly, this invention relates to a helicopter having landing gear depending therefrom for supporting the helicopter on land and a buoyant hull in conjunction therewith for supporting the helicopter on a body of water.

This invention further relates to a helicopter having a chassis from which landing gear structure depends and with which a buoyant light weight hull is detachably connected between the landing gear structure in close conformity with the contoured underside of the chassis so that the hull forms a substantial contoured continuation of the chassis, whereby drag produced by the hull is minimized during flight. The hull is designed to accommodate portions of the landing gear structure so that the hull may be attached in close contoured conformity to known helicopters with minimum modification, if any, of the helicopter or its landing gear structure.

Hence, it is the purpose of this invention to impart amphibious characteristics to a helicopter so that the helicopter may be operated with equal facility from land or a body of water. By providing a discrete buoyant light weight hull which is designed to conform closely with the underside of a helicopter chassis, and by providing cooperable means on the hull and the chassis for detachably securing the hull to the chassis, conversion of a helicopter which formerly was capable of landing only on land may be made readily so that the helicopter can be easily adapted for water operations as well.

Accordingly, objects of this invention include the provision of a helicopter having a buoyant hull secured thereto and forming the underside thereof; the provision of an amphibious helicopter having a buoyant light weight hull detachably connected with the underside of the helicopter chassis; the provision of a preformed, self-supporting buoyant hull for a helicopter designed to be detachably connected to the helicopter chassis between landing gear structure depending from opposite sides of the chassis; and the provision of a detachable hull for attachment to a helicopter chassis, which hull includes channels for accommodating portions of the landing gear structure of the helicopter when the hull is attached to the chassis.

These and other objects of this invention will become apparent from a study of the following description in which reference is directed to the accompanying drawings.

FIG. 6 is a plan view of the subject detachable hull;

FIG. 7 is a longitudinal section through the subject hull taken in the plane of line 7—7 of FIG. 6;

Figure 1:
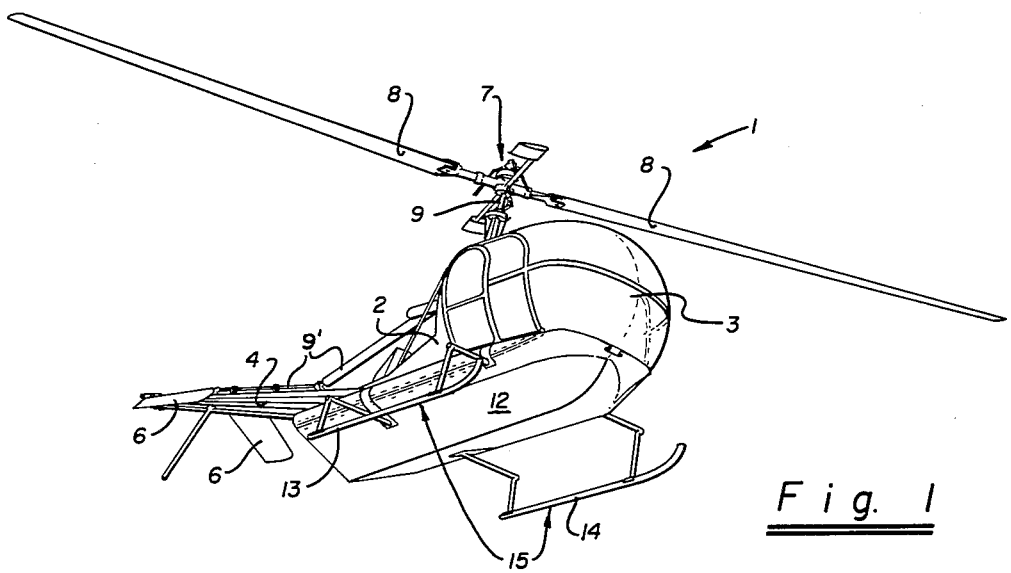
FIG. 1 is a generally isometric view of a helicopter with a hull of this invention operatively connected therewith.
Figure 2:
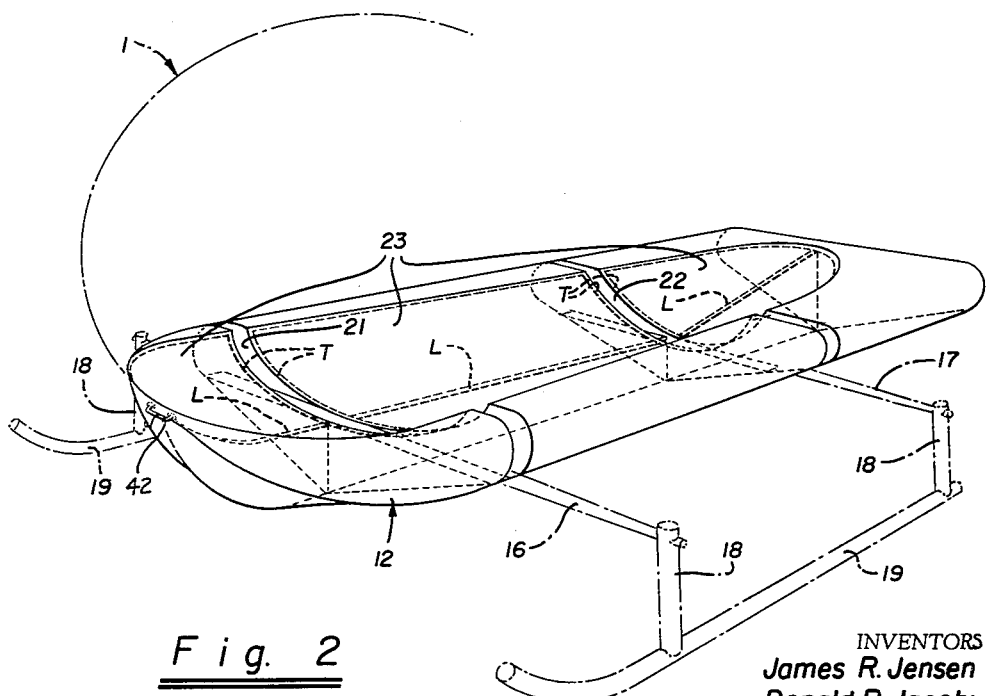
FIG. 2 is an isometric view of one embodiment of a hull of this invention.
Figure 4:
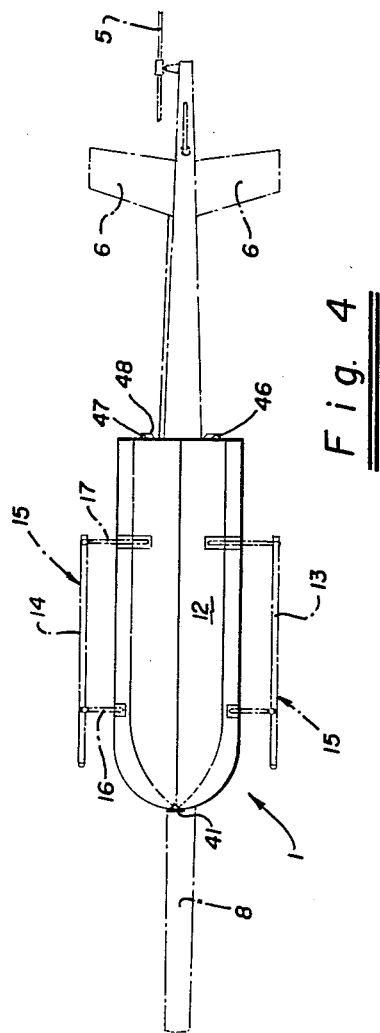
FIGS. 3 through 5 are side elevation, bottom plan and front views, respectively, of a helicopter with the subject hull connected therewith.
Figure 3:
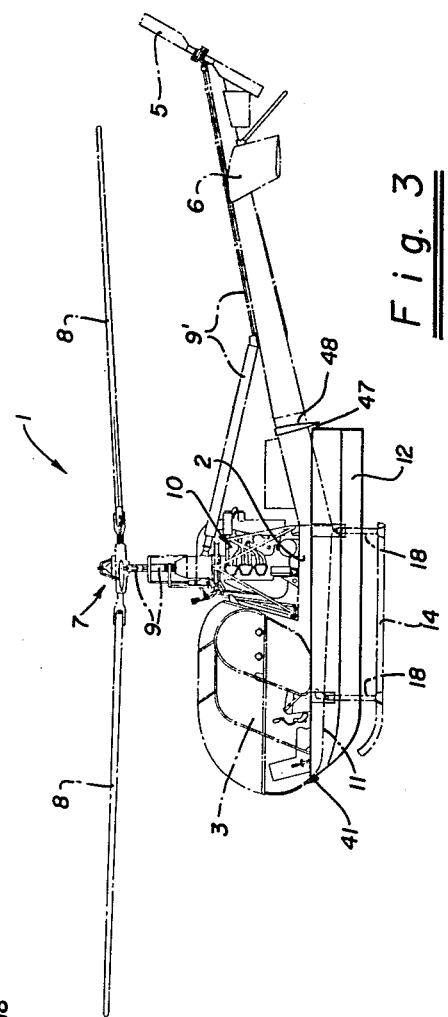

FIGS. 8 and 9 are vertical sectional views through the hull taken in the planes of lines 8—8 and 9—9, respectively, of FIG. 7;

FIG. 10 is a somewhat enlarged view of the forepart of a helicopter chassis and the subject hull illustrating part of one embodiment of means for detachably connecting the two together;

FIGS. 11 through 13 are views corresponding to FIGS. 6 through 8, respectively, showing a modification of the subject hull;

FIG. 14 is a partial longitudinal sectional view through a further modified hull designed for attachment to a helicopter which employs a torsion type landing gear therewith; and FIG. 15 is a vertical section through the modified hull taken in the plane of line 15—15 of FIG. 14.

As noted previously, the principle objective of this invention is to impart amphibious capability to a helicopter by providing a buoyant hull for detachable connection with a helicopter in a manner which does not interfere with the operation of known landing gear attached to and depending from the helicopter chassis. The subject hull is designed to accommodate therein at least a portion of the landing gear structure of the helicopter so that the hull may be attached in close conformity with the helicopter chassis.

In this regard, the hull is equally well adapted for use with helicopters which employ bendable type landing gear structure or twistable landing gear structure. That is, the hull may accommodate bendable type gear structure in which bendable rods extend transversely of and are secured to the helicopter chassis and from which depend skid type or other suitable landing surface engaging means. Alternatively, the hull of this invention may accommodate twistable or torsion rod type landing gear in which torsion rod structures extend generally longitudinally of the aircraft chassis, and from opposite ends of which skid type or other suitable landing surface engaging means depend.

Of course it should be understood that the hull of this invention may be designed, using the concepts taught herein, to accommodate other types of landing gear structure as well.

While one desirable hull configuration and construction has been illustrated in the accompanying drawings, and while one relatively simple arrangement for detachably connecting a hull with a helicopter chassis has been illustrated in the drawings, it should be understood that other hull constructions and other attaching arrangements are contemplated as falling within the scope of this invention as may be determined by one skilled in the art after this disclosure has been studied. It is an important feature of this invention, however, that the hull construction employed and the means chosen for detachably securing the hull to the helicopter be readily adapted for use with presently known helicopter constructions, so that modifications to the helicopters other than of a relatively simple nature are unnecessary to adapt the helicopter for amphibious operations as herein disclosed.

In this regard, it should be understood that while the hull embodiment illustrated comprises a substantially rigid preformed hull construction which may be formed from wood or suitable metal, such as aluminum, other buoyant constructions which adapt themselves to attachment to a helicopter, such as inflatable bag constructions or the like, may also be used.

With the foregoing in mind, reference is directed to

FIGS. 1 and 3 through 5, which generally illustrate an installation employing this invention. A helicopter 1 of known construction is shown which comprises a chassis 2 which includes a pilot's station 3. Extending rearwardly from the chassis is a tail boom 4 on which is rotatably mounted a tail rotor 5 and a pair of flight stabilizing adjustable tail planes 6.

A rotor, generally designated 7, which includes a series of rotor blades 8, is positioned over the chassis of the helicopter for rotation thereabove about the upright axis of rotor shaft 9 to propel the helicopter in flight. Means is provided for rotating the rotor above the chassis which in the illustrated embodiment comprises an engine 10 mounted on the chassis rearward of the pilot's station. The rotor 7 is operatively connected with the engine 10 through the rotor shaft 9 in the well known manner. Also, the tail rotor 5 is operatively connected with the engine 10 by a tail rotor drive shaft structure 9′ in the well known manner.

Figure 5:
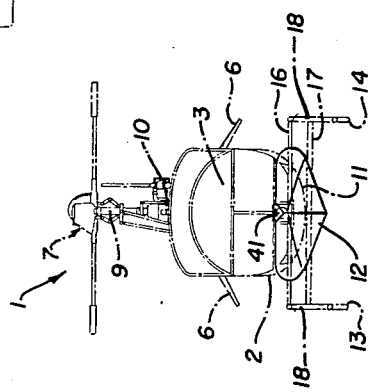

The underside or under surface 11 of the chassis 2 is generally rounded, as shown in dotted lines in FIG. 5. The exact contour of the chassis underside may vary with the helicopter.

Secured to the chassis underside in close conformity therewith is a buoyant hull 12 intended to support the helicopter on a body of water. The hull is so designed that the same is positionable between and does not interfere with opposite depending portions 13 and 14 of the landing gear structure 15 of the aircraft at opposite sides thereof. That is, the hull is secured to the underside of the helicopter chassis between the landing gear structure in such a way that the hull receives and accommodates at least part of the landing gear structure.

In the embodiment of the invention shown in FIGS. 1 through 13, the landing gear structure is of a type generally referred to as the bendable type which comprises a pair of generally parallel fore and aft bendable rods 16 and 17. Each of these rods is secured to the aircraft chassis in any suitable and well known manner and extends generally transversely of the longitudinal axis of the chassis. With the helicopter embodiment shown, the fore rod 16 is positioned vertically above the aft rod 17 due to the contour of the chassis underside.

The opposite ends of each rod 16 and 17 are located outboard of the chassis and a strut 18 is secured to each rod end. To the lower end of each strut suitable landing surface engaging means are operatively connected. In the embodiment illustrated, such landing surface engaging means comprises a skid 19 secured to and extending between the respective struts depending from the fore and aft rods on each side of the aircraft.

It should be understood that suitable landing surface engaging means other than skids, such as wheels, may be connected with the struts 18 if so desired without departing from the scope of this invention.

The embodiment of the buoyant hull illustrated in FIGS. 2 and 6 through 9 is of generally rigid water-tight construction which has generally the contour of an outboard motorboat hull. So that the hull may be secured in close conformity with the helicopter chassis underside, it is designed to accommodate at least part of the transverse rods 16 and 17 of the landing gear structure. To this end, the hull is provided with spaced transverse channels 21 and 22. Such channels permit the hull to be positioned beneath the helicopter chassis between the skids 19 and struts 18 as a substantial low drag continuation of the chassis.

As perhaps best seen in FIGS. 7 through 9, each of the rods 16 and 17 is engaged with a seat in the hull defined by structural members 23 and 24 of the hull which define the bottoms of the respective channels.

The hull, in effect, is divided by channels 21 and 22 into three spaced compartments, each of which may be strengthened and reenforced by a series of cooperable longitudinal and transverse structural members L and T, respectively. Note FIGS. 2 and 6.

In the embodiment illustrated, the hull is made of water-tight construction due to the upper concave panel structure 23 which generally defines the upper surface of the hull. Panel structure 23 is of a contoured concave configuration which conforms closely to the longitudinal and transverse convexity of the chassis underside of the helicopter to which the hull is to be attached. This panel structure thereby defines the contoured seat in which the helicopter chassis rests.

While a water-tight enclosed hollow hull has been illustrated in the drawings, an open top hull also may be provided by omitting the panel structure 23. In such case, the seat for the helicopter may be provided by contouring the thus exposed edges of the reinforcing structural members L and T of the hull.

With the hull embodiment shown, when the hull is attached to the helicopter chassis, the respective landing gear rods 16 and 17 are free to flex and bend upwardly into the upper portions of the channels 21 and 22 when the aircraft is landed on the ground without interference from the hull. In this regard, it should be noted that the landing gear structure depends from the hull beneath and beyond the bottom thereof so that the hull will not contact the ground during landing.

The modified hull shown in FIGS. 11 through 13 corresponds to the hull thus far described except that the modified hull is provided with means for imparting stability to the helicopter when the same is supported on a body of water by the hull. To this end, laterally projecting outrigger means is provided adjacent the bottom of the hull which comprises sponsons 26 and 27. Such sponsons are arranged toward the aft end of the hull preferably in line with the aft rod 17 of the landing gear structure. Preferably the sponsons are of hollow construction to enhance the buoyancy of the hull. The sponsons are contoured to minimize drag during flight.

While thus far the invention has been described in conjunction with bendable type landing gear structure, it should be understood that the invention is equally well adapted for use with helicopters which employ therewith other type of landing gear structure. For example, as shown in FIGS. 14 and 15, a hull is secured to the underside of a helicopter chassis to which is secured twistable torsion rod landing gear structure 31.

Such torsion rod structure comprises, in the illustrative embodiment shown, an elongated torsion rod 32 secured at each side of the helicopter chassis generally parallel to the longitudinal axis of the chassis. Each rod is secured intermediate its ends, as at 33, by any suitable means to the helicopter chassis so that the rod cannot rotate freely relative to the chassis.

Opposite ends of each torsion rod are twistably mounted in bearings 34 and 36 for pivotal movement relative to the chassis. That is, the rod sections lying on opposite sides of location 33 may twist about their respective longitudinal axes.

Depending from the opposite ends of each of the torsion rods 32 is a generally L-shaped strut 37 with which a skid 38, or other suitable landing surface means, is secured.

With this torsional arrangement, the buoyant hull 12 is provided not only with traverse channels 21 and 22 for accommodating the upper portions of struts 37 of the landing gear structure on opposite sides of the aircraft but also with longitudinal channels 39 and 40 which accommodate therein the respective torsion rods 32.

With all embodiments of the invention disclosed herein, it should be noted that the hull is designed not only to provide suitable support for the helicopter on a body of water, but also is contoured to conform with the underside of the chassis as a substantial continuation of the chassis so that the hull does not appreciably impart drag to the aircraft during flight.

The hull preferably is attached to the chassis in a manner which does not necessitate any appreciable modification of the chassis or the landing gear structure. To this end, securing means preferably of a relatively simple nature are employed. In the embodiment illustrated, such means for detachably connecting the hull to the chassis includes interengaged hook and eye arrangement combined with a fastening strap arrangement.

As seen in FIG. 10, the hull at its forward end and the chassis at its forward end adjacent its underside are provided with interengageable hook and eye means generally designated 41. Such hook and eye means comprises an elongated apertured eye member 42 projecting from and secured to the forward end of the hull. Depending from the helicopter chassis is a hook member 43 having a reversely bent bight portion 44 extending rearwardly of the aircraft chassis. The eye member 42 of the hull is slidably received in the bight portion 44 of the hook 43. In this manner the fore part of the hull and the chassis are operatively and securely interconnected with each other.

The aft portion of the hull is secured in operative engagement with the chassis by the fastening strap arrangement shown. To this end, the hull is provided, as seen best in FIGS. 6 and 7, with a pair of spaced projecting eyes 46 and 47 with which an adjustable strap 48 is connected by suitable snaps or hooks. The strap extends over the tail boom 4 of the helicopter and thereby maintains the aft end of the hull snugly in engagement with the chassis. So long as the aft end is secured in position by the strap 48, it is not possible to disengage the eye 42 of the hull from the hook 43 of the chassis.

By employing such a hull securing arrangement, the only modification of a conventional helicopter to adapt the same to accommodate the detachable hull is the provision of a hook 43 on the forward end of the helicopter chassis.

While one specific embodiment of means for detachably connecting the hull to the chassis has been illustrated, it should be understood that other embodiments also may be employed. For example, a series of oversize latches of the general type commonly employed on steamer trunks could be used at spaced locations along the length of the aircraft chassis and hull. The exact means for detachably connecting the hull to the chassis may be varied as required and the exact means chosen will be dictated to a large extent by the construction of the particular helicopter to which the hull is to be detachably connected.

If it is desired to close off the transverse channels 21 and 22 of the hull which accommodate the laterally projecting rod portions of the helicopter landing gear structure, suitable plug means (not shown) which conform to the shape of the channels may be provided and employed. So long as such plug means do not interfere with proper functioning of the landing gear structure, use thereof may be found desirable.

Having thus made a full disclosure of this invention relating to imparting amphibious characteristics to a known helicopter, attention is directed to the appended claims for the scope of protection to be afforded thereto.

We claim:

1. An amphibious helicopter comprising a chassis, a rotor projecting above said chassis, means for rotating said rotor to propel said helicopter in flight, landing gear structure operatively fixed to the underside of said chassis and depending therefrom on opposite sides of said helicopter for supporting said helicopter on the ground, a buoyant hull on the underside of said chassis conforming closely to the contour of said chassis underside for supporting said helicopter on a body of water, said hull being positioned between said landing gear structure and having channels therein accommodating portions of said landing gear structure, said hull forming a substantial contoured continuation of said chassis, and means securing said hull to said chassis.

2. The helicopter of claim 1 in which said hull is detachably connected with said chassis by said securing means so that said hull may be separated from said chassis.

3. An amphibious helicopter comprising a chassis having an underside of predetermined contour, a rotor positioned above said chassis and rotatable thereover, means for rotating said rotor for propelling said helicopter in flight, landing gear structure for supporting said helicopter on the ground, said landing gear structure being secured to said chassis and including rod means projecting laterally from said chassis and depending therefrom on opposite sides thereof, a buoyant hull on the underside of said chassis between said landing gear rod means, said hull having channels therein for accommodating said rod means and a contoured depression in its upper portion conforming in configuration generally to the contoured underside of said chassis, and means detachably securing said hull in close contoured engagement with said chassis underside generally as a substantial continuation thereof.

4. The helicopter of claim 3 in which said hull is of watertight construction and in which said contoured depression therein is defined generally by concave panel structure which comprises generally the upper surface of said hull.

5. An amphibious helicopter comprising a chassis, a buoyant hull detachably secured to the underside of said chassis, means detachably securing said hull to said chassis so that said hull may be separated from said chassis, and landing gear structure secured to said chassis projecting from and depending beyond said hull on opposite sides thereof, said hull being provided with channels through which portions of said landing gear structure extend, said channels permitting said hull to be secured to said chassis in close fitting contoured relationship with the underside of said chassis.

6. An amphibious helicopter capable of landing on both land and water comprising a chassis, a buoyant hull secured to and depending from said chassis for supporting said helicopter on a body of water with said chassis generally above such water, and landing gear structure secured to said chassis, said landing gear structure having portions thereof projecting from said chassis on opposite sides of said hull with landing surface engaging means thereon depending beyond said hull so that said helicopter may be landed on a solid surface without interference from said hull.

7. The amphibious helicopter of claim 6 which includes stabilizing means projecting laterally from said hull for imparting lateral stability to said helicopter when said helicopter is supported by said hull on a body of water.

8. The amphibious helicopter of claim 6 in which said hull includes channel means therein accommodating said landing gear structure adjacent said chassis so that said hull may be secured in close fitting low-drag conformity to the underside of said chassis between the depending opposite portions of said landing gear structure.

9. The amphibious helicopter of claim 6 in which said hull is a discrete self-supporting water tight structure detachably secured to said chassis.

10. An amphibious helicopter capable of landing on both land and water comprising a chassis having an underside of predetermined contour, a tail boom extending rearwardly from said chassis with a tail rotor mounted thereon, a lift rotor rotatably positioned above said chassis, means for rotating said lift rotor and said tail rotor, a buoyant self-supporting hull detachably secured to the underside of said chassis for supporting said helicopter on a body of water with said tail boom and said tail rotor generally above the surface of said water so that said helicopter may take off therefrom and land thereon, means detachably securing said hull to said chassis, and landing gear structure secured to said chassis and depending therefrom on opposite sides of said hull, said landing gear structure including landing surface engaging means projecting below and beyond said hull for supporting said helicopter on a solid landing surface so that said helicopter may land on and take off from said solid surface without interference from said hull.

11. The amphibious helicopter of claim 10 in which said hull includes channel means accommodating therein portions of said landing gear structure so that said hull may be secured in close fitting relationship with the contoured underside of said chassis.

References Cited in the file of this patent

UNITED STATES PATENTS

| | | |
|---|---|---|
| 2,940,700 | Trannoy | June 14, 1960 |

FOREIGN PATENTS

| | | |
|---|---|---|
| 612,666 | Great Britain | Nov. 16, 1948 |
| 988,784 | France | May 9, 1951 |